(No Model.)  2 Sheets—Sheet 1.
J. J. & E. T. FAULKNER.
FLOUR BOLT.
No. 348,199.  Patented Aug. 31, 1886.
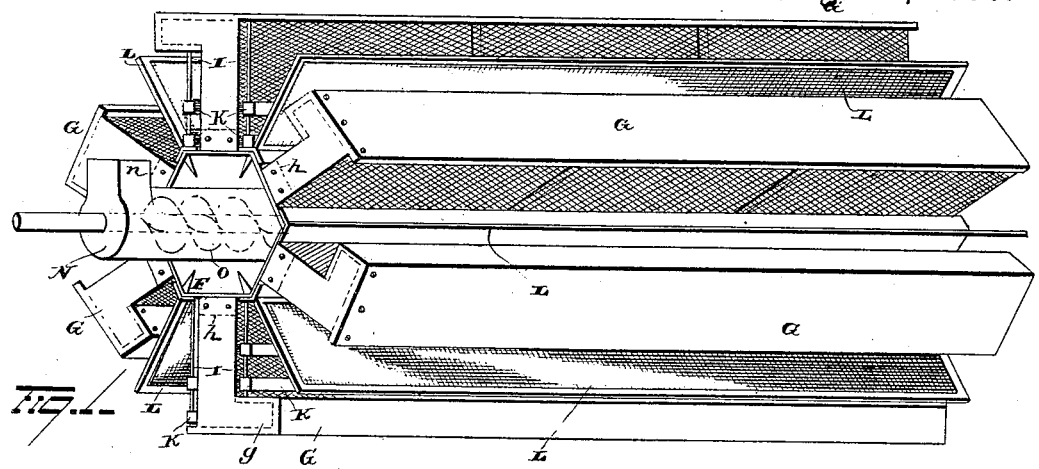
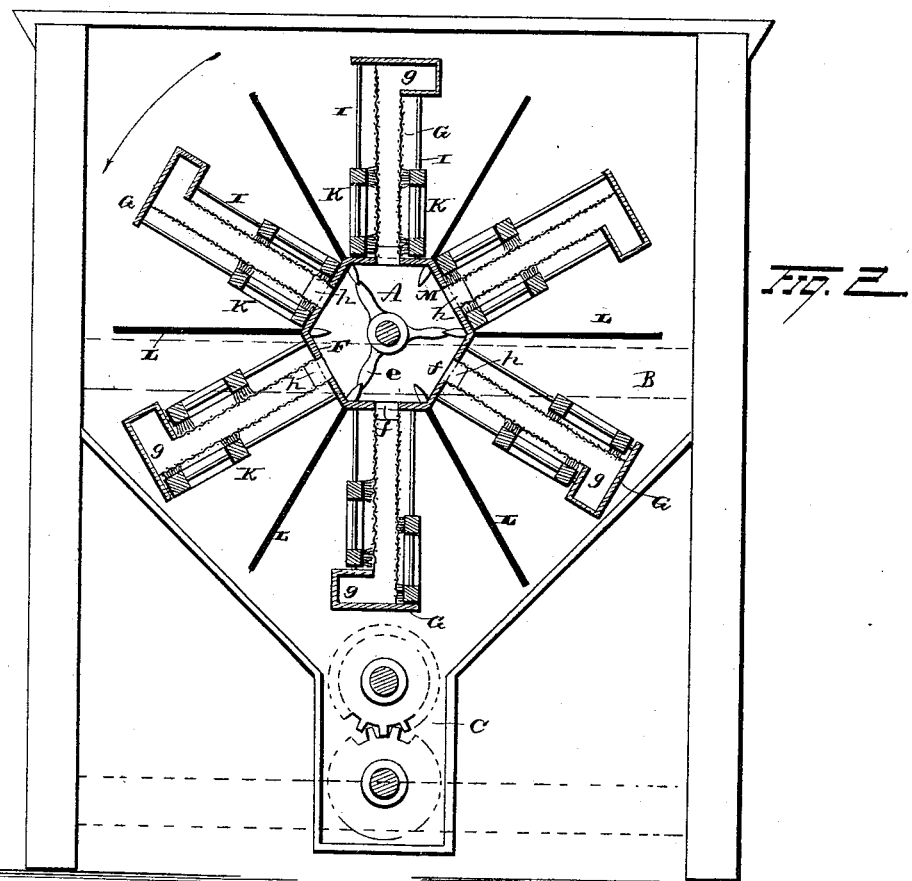
WITNESSES  INVENTOR
J. J. Faulkner,
E. T. Faulkner.
Attorney (No Model.)
2 Sheets—Sheet 2.

J. J. & E. T. FAULKNER.
FLOUR BOLT.

No. 348,199. Patented Aug. 31, 1886.

WITNESSES

INVENTOR

UNITED STATES PATENT OFFICE.

JAMES JONES FAULKNER AND ELZA TAYLOR FAULKNER, OF McMINNVILLE, TENNESSEE, ASSIGNORS OF ONE-THIRD TO CHARLES H. PLUMMER, OF JACKSON, MICHIGAN.

FLOUR-BOLT.

SPECIFICATION forming part of Letters Patent No. 348,199, dated August 31, 1886.

Application filed November 10, 1885. Serial No. 182,321. (No model.)

*To all whom it may concern:*

Be it known that we, JAMES JONES FAULKNER and ELZA TAYLOR FAULKNER, of McMinnville, in the county of Warren and State of Tennessee, have invented certain new and useful Improvements in Flour-Bolts; and we do hereby declare the following to be a full, clear, and exact description of the invention, such as will enable others skilled in the art to which it appertains to make and use the same.

Our invention relates to an improvement in flour-bolts and middlings-purifiers. The object is to provide a bolt which shall combine the best features of both the gravity and rotary forms, and which will bolt flour faster and better than the bolts at present in use with the expenditure of a minimum amount of power. A further object is to provide automatic cleaners and simple and effective means for preventing the bolted flour from interfering or mingling with the flour in the bolt.

With these ends in view our invention consists in certain features of construction and combinations of parts, as will be hereinafter described, and pointed out in the claims.

Figure 3:
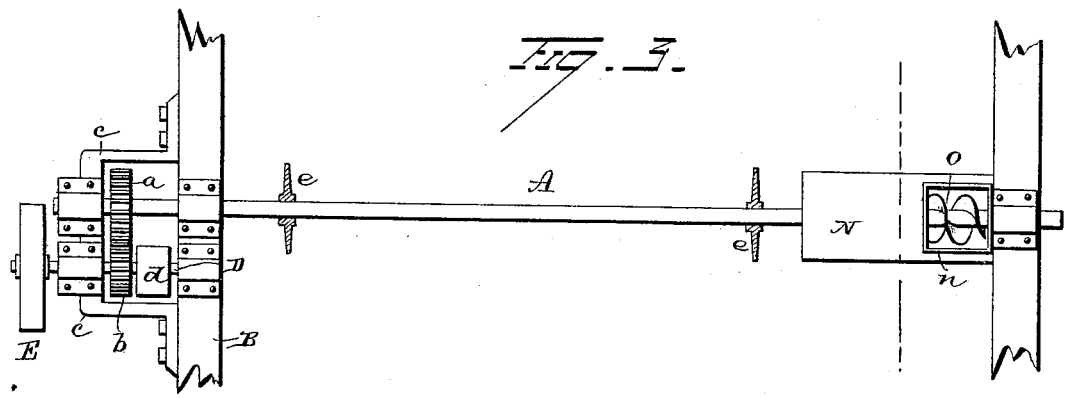
Figure 4:
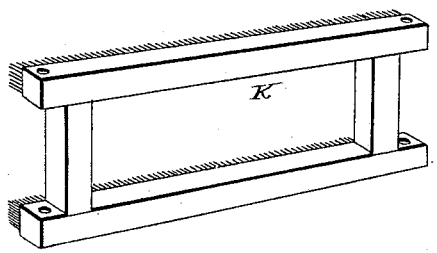

In the accompanying drawings, Figure 1 is a view of the bolt in perspective. Fig. 2 is a view in transverse vertical section. Fig. 3 is a view of the reel-shaft and driving-gear, and Fig. 4 is a detached view of one of the brushes.

A represents a shaft journaled in a suitable supporting-frame, B, and occupying a horizontal or slightly-inclined position above an elongated flour-receptacle, C. The shaft A is driven by a gear-wheel, $a$, in engagement with a pinion, $b$, the latter mounted on a short shaft, D. The shaft D is journaled in suitable bearings attached to the frame B and to a loop-shaped bracket, $c$, secured thereto, and has the pulley $d$ secured thereon outside of the bracket $c$, which pulley is driven by a belt leading to a corresponding pulley on the engine-shaft, or by any other approved means. The shaft D also has a pulley, E, secured thereon for communicating motion to the conveyer located in the flour-receptacle C.

A cylindrical or polygonal drum, F, preferably hexagonal, as shown, is attached to the shaft A by means of spiders $e$, located at its ends, and at suitable distances between its ends, if required.

The sides of the drum F are provided with elongated slots $f$, over which are secured the ends of hollow L-shaped arms G. The outer ends of the arms G are tightly capped, and the laterally-extending portions $g$ are incased with solid or imperforate material, forming retaining-pockets. In fact, the retaining-pocket $f$ is the essential feature of the L-shaped construction, and the shape may be varied in many ways, and yet produce the same results, the shape shown being a very convenient and simple form of construction. The sides of the hollow arms are formed of sieve-cloth H, and the ends of wood or metal. The arms G are conveniently secured to the drum by means of outwardly-turned flanges $h$, formed integral with the drum or bolted thereto. At the ends of the arms G, and on opposite sides thereof, are firmly secured the rods I, their inner ends being secured to the drum and their outer ends to the casings of the pockets $g$ and to the projecting caps on the ends of the arms. Oblong frames K, provided with bristles or other brush material on their side rails, are secured on the rods I in a free radially-sliding adjustment, the rods and the brushes being so located and constructed that the brushes will rest in light contact with the sieve-cloth or screens.

The width of the brush-frames is less than the radial length of the arms, preferably about one-half the length of the arms, or a trifle less; hence as the drum rotates and the arms are successively brought into upright and depending positions, the brushes will slide respectively toward and away from the drum, and thereby keep the sieve-cloth or screens free from clogging.

Between each two successive arms G is located a shield and guide, L, extending radially from the drum, and constructed of some thin material—such as cloth or sheet metal—for the purpose of preventing the bolted flour as it leaves the sieve-cloth or screens from falling onto the bolting-cloth or screens of the adjacent hollow arm, and thereby interfering with its free and effective work. The shield and guide L, as they reach their downwardly-inclined position, empty their loads into the receptacle C.

The interior of the drum F is provided with a series of wings, M, extending from positions between the hollow arms radially toward the axis of the drum. A feed-cylinder, N, is secured about the shaft A at one end of the drum, and extends therein to any desired point, the said cylinder being provided at its outer end with a feed-hopper, n. The shaft A has a free rotary motion within the cylinder, and is provided with a screw-conveyer, O, adapted to force the flour as it enters the hopper n into the drum F.

The drum is supposed to rotate in the direction shown by the arrow. As the flour falls from the feed-cylinder N, it either passes directly into the hollow arms, which are in a depending or downwardly-inclined position, or is caught in the pockets formed by the wings M and the sides of the drum. As it slides along the lower sides of the arm over the sieve-cloth or screen, a portion passes through the cloth or screen, and is caught by the shield and guide L. The remaining portion extends onwardly to the end, and is caught and retained in the pocket g until the arm reaches an upwardly-inclined position, when it begins to return by gravity and slides along the opposite side of the arm. The brushes, which are reciprocated by gravity, automatically slide over the sieve-cloth or screen, which is for the moment out of use, just before it is brought into use, thus causing it to do the greatest amount of and most effective work. By the use of a fan in connection with the reel a suction of air may be maintained through the bolting-cloth, and the machine used as a middlings-purifier.

It is evident that many slight changes might be resorted to in the form and arrangement of the several parts described without departing from the spirit and scope of our invention; hence we do not wish to limit ourselves strictly to the construction herein set forth; but, Having fully described our invention, what we claim as new, and desire to secure by Letters Patent, is—

1. In a flour-bolt, the combination, with a polygonal drum having a series of oblong slots in the sides thereof, of a series of rectangular hollow bolting-arms secured to the sides of the drum over the slots therein, substantially as set forth.

2. In a flour-bolt, the combination, with a revolving drum, of one or more outwardly-extending hollow bolting-arms provided with flour-retaining pockets in their outer ends, substantially as set forth.

3. In a flour-bolt, the combination, with a drum having a series of oblong slots in the sides thereof, of a series of rectangular hollow arms secured to the sides of the drum over the slots therein, the sides of said arms being formed of sieve-cloth, substantially as set forth.

4. In a flour-bolt, the combination, with a revolving drum, of a series of outwardly-extending hollow arms provided with flour-retaining pockets in their outer ends, the sides of the arms being covered with sieve-cloth, and the outer ends or pockets being formed of imperforate material, substantially as set forth.

5. In a flour-bolt, the combination, with a revolving shaft and a hollow arm attached thereto and provided with a sieve-cloth on its side, of a clearing-brush secured to the arm and adapted to slide in contact with the sieve-cloth, substantially as set forth.

6. In a flour-bolt, the combination, with a revolving shaft, a hollow arm having open sides secured to said shaft, and bolting-cloth secured to said arm over the open sides thereof, of rods located alongside of the arm and a brush adapted to slide on said rods in contact with the bolting sides of the arm, substantially as set forth.

7. The combination, with a revolving shaft and a series of hollow arms secured thereto, the sides of said hollow arms being formed of sieve-cloth, of the imperforate shields separate from the arms and secured to the shaft between the sieve-cloth of each two successive arms, for the purpose substantially as set forth.

8. The combination, with a revolving shaft, the slotted drum secured thereon, the hollow arms attached to the drum, and the feed-cylinder, of a set of elevator-wings extending from the inside of the drum toward its axis, substantially as set forth.

9. The combination, with the polygonal-shaped drum having oblong slots in the sides thereof and the outwardly-extending hollow bolting-arms having flour-retaining pockets in their outer ends, of the screw-conveyer for feeding flour to the arms, substantially as set forth.

In testimony whereof we have signed this specification in the presence of two subscribing witnesses.

JAMES JONES FAULKNER.
ELZA TAYLOR FAULKNER.

Witnesses:
B. W. SPARKS,
J. M. BURGEN.